US012296768B1

(12) United States Patent
Parks et al.

(10) Patent No.: US 12,296,768 B1
(45) Date of Patent: May 13, 2025

(54) SIDE UNDERRIDE PREVENTION SYSTEM FOR A BOX STYLE TRAILER

(71) Applicants: Taylor Parks, Alvarado, TX (US); Chandra K. Thorbole, Alvarado, TX (US); Lorenzo Kirk Parks, Alvarado, TX (US)

(72) Inventors: Taylor Parks, Alvarado, TX (US); Chandra K. Thorbole, Alvarado, TX (US); Lorenzo Kirk Parks, Alvarado, TX (US)

(*) Notice: Subject to any disclaimer, the term of this patent is extended or adjusted under 35 U.S.C. 154(b) by 315 days.

(21) Appl. No.: 18/096,930

(22) Filed: Jan. 13, 2023

Related U.S. Application Data

(60) Provisional application No. 63/299,486, filed on Jan. 14, 2022.

(51) Int. Cl.
*B60R 19/56* (2006.01)
*B62D 35/00* (2006.01)
*B62D 63/08* (2006.01)

(52) U.S. Cl.
CPC ............ *B60R 19/565* (2013.01); *B62D 63/08* (2013.01); *B62D 35/001* (2013.01)

(58) Field of Classification Search
CPC ...... B60R 19/565; B62D 63/08; B62D 35/001
See application file for complete search history.

(56) References Cited

U.S. PATENT DOCUMENTS

| | | | |
|---|---|---|---|
| 7,780,224 B2 | 8/2010 | Roush | |
| 9,463,759 B1 * | 10/2016 | Kiefer | B60R 19/56 |
| 9,487,171 B2 | 11/2016 | Rogers | |
| 9,908,493 B1 * | 3/2018 | Kiefer | B60R 19/56 |
| 10,549,797 B2 * | 2/2020 | Ehrlich | B62D 35/001 |
| 10,632,948 B2 | 4/2020 | Roush et al. | |
| 10,940,817 B2 | 3/2021 | Kunkel et al. | |
| 10,946,824 B2 | 3/2021 | Kunkel et al. | |
| 11,691,583 B1 * | 7/2023 | Bennett | B62D 35/001 296/180.4 |
| 2008/0116702 A1 | 5/2008 | Enz et al. | |
| 2010/0264691 A1 * | 10/2010 | Giromini | B60R 19/56 296/180.4 |
| 2014/0159419 A1 * | 6/2014 | Baker | B62D 35/001 296/180.4 |
| 2018/0118143 A1 * | 5/2018 | Ponder | B62D 35/001 |
| 2019/0077470 A1 * | 3/2019 | Kunkel | B62D 21/20 |
| 2019/0256026 A1 * | 8/2019 | Kunkel | B60R 19/565 |
| 2020/0269789 A1 | 8/2020 | Ponder | |
| 2022/0009436 A1 * | 1/2022 | Watson | B60R 19/565 |
| 2022/0063535 A1 * | 3/2022 | Batzer | B60R 19/565 |

FOREIGN PATENT DOCUMENTS

CA      3017256 A1 *  3/2019  ........... B60R 19/565

* cited by examiner

*Primary Examiner* — Lori Lyjak
(74) *Attorney, Agent, or Firm* — Richard Eldredge; Leavitt Eldredge Law Firm

(57) ABSTRACT

A side underride prevention system configured to be coupled to a trailer to operate in upward and downward configurations, includes a front mounting bracket assembly configured to be coupled to the trailer, a rear mounting bracket assembly configured to be coupled to the trailer at a location spaced-apart from the front mounting racket assembly, and a cable grid configured to be coupled with front anchor system and rear anchor system to extend at least partially along a length of each side of the trailer between the front mounting bracket assembly and the rear mounting bracket assembly.

2 Claims, 18 Drawing Sheets

SIDE UNDERRIDE PREVENTION SYSTEM FOR A BOX STYLE TRAILER

CROSS REFERENCE TO RELATED APPLICATIONS

This application is a continuation of U.S. application Ser. No. 63/299,486 filed on Jan. 14, 2022, of which is hereby incorporated by reference in its entirety.

BACKGROUND

1. Field of the Invention

The present invention relates generally to structural accessories for trailer systems, and more specifically, to a side underride prevention system to be attached to a box style trailer system.

2. Description of Related Art

The majority of truck trailer designs have a dangerously high profile with respect to the trailer floor and the ground and the front landing gear and the rear wheel assembly. There is always risk of small size automobiles under-riding the truck trailers from sideways causing accidents producing critical or fatal injuries.

There is an unmet need for an underride prevention system suitable for box style trailers which prevents under riding from sideways.

Accordingly, although great strides have been made in the area of side underride prevention system for box style trailer system, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
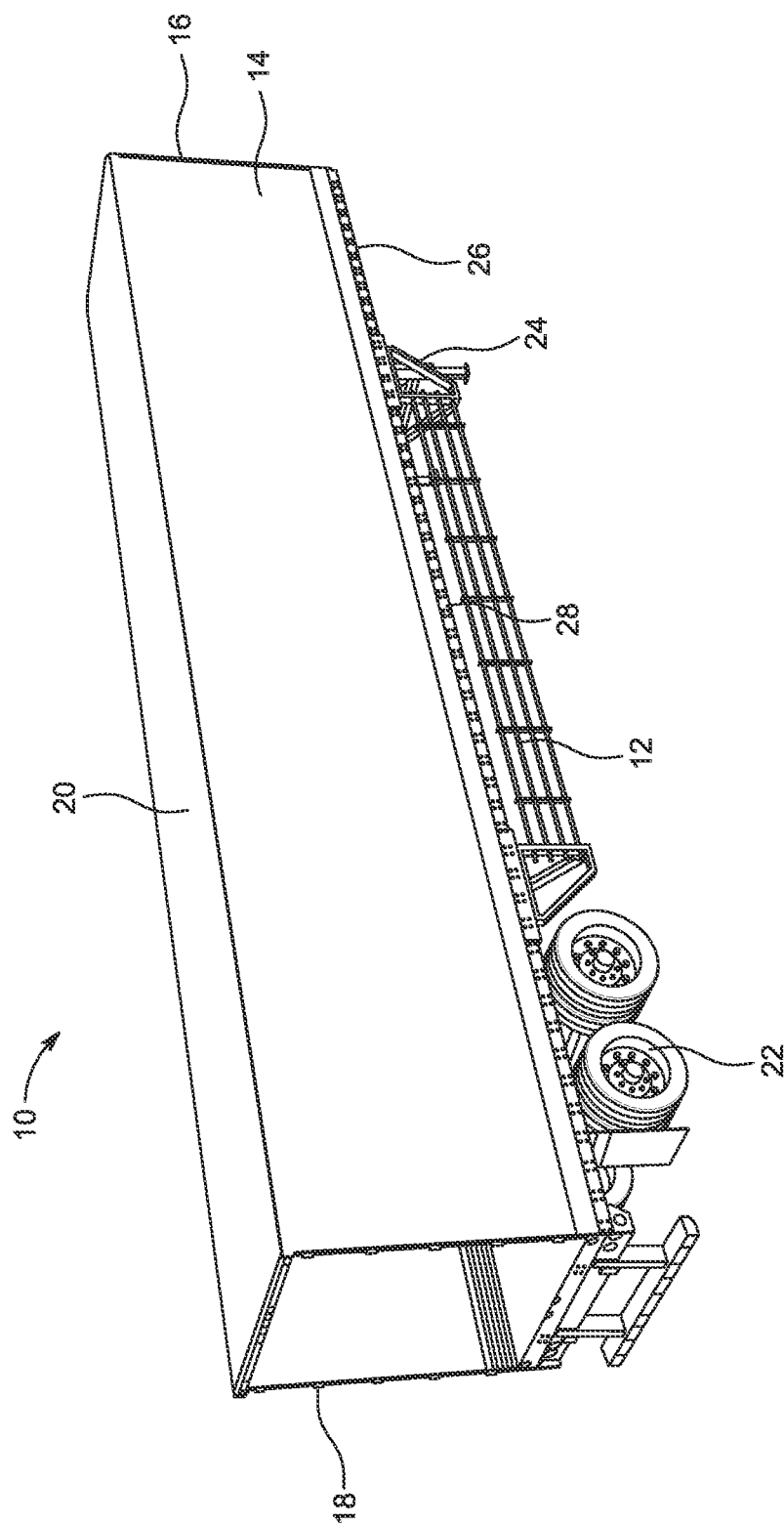
FIG. 1 is a perspective view of a side underride prevention system positioned between rear wheel assembly and front landing gear of a trailer in downward configuration.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

For the purposes of promoting an understanding of the principles of the invention, reference will now be made to a number of illustrative embodiments shown in the attached drawings and specific language will be used to describe the same. While the concepts of this disclosure are described in relation to a box style trailer, it will be understood that they are equally applicable to other trailers generally, and more specifically to conventional flat-bed and/or box or van type trailers or semi-trailers, examples of which include, but should not be limited to, straight truck bodies, small personal and/or commercial trailers and the like.

Referring now to the drawings wherein like reference characters identify corresponding or similar elements throughout the several views, FIGS. 1-18 depict various views of a side underride prevention system in accordance with the present application.

As depicted in FIGS. 1-9, a trailer 10 includes a side underride prevention system 12 coupled to and extending downwardly from each side wall 14 of the trailer 10. Illustratively, the side underride prevention system 12, extends below a side wall 14 of the trailer 10 at least partially along a length of the trailer. In particular, as is discussed in detail below, the side underride prevention system 12 extends generally between the front landing gear 24 and the rear wheel assembly 22 of the trailer 10. However, the side underride prevention systems described herein may be modified to extend along a greater or a lesser length of the trailer 10 than what is illustratively shown in the figures. In other words, the side underride prevention systems disclosed herein may be modified to extend along the entire, or substantially the entire, length of the trailer 10 or may be modified to extend along only a small portion of the length of the side of the trailer 10.

Figure 2:
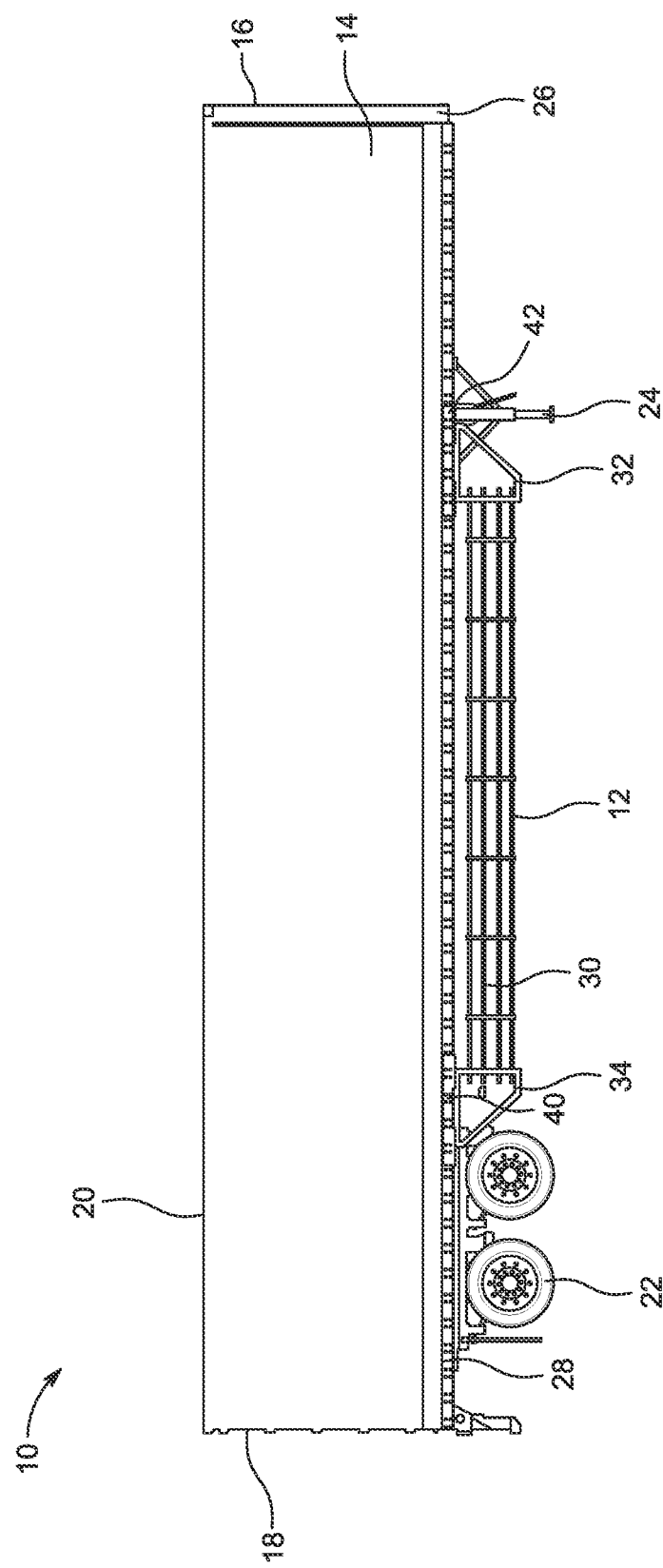
FIG. 2 is an orthographic view of the trailer with the side underride prevention system in downward and deployed configuration.

As depicted in FIG. 1, the trailer 10 includes side walls 14, a front-end wall 16, a rear end wall 18, and a roof 20 defining an inside storage portion able to store various articles or goods therein. The trailer 10 further includes a rear wheel assembly 22 and a front landing gear 24 each coupled to a bottom wall or floor assembly 26 of the trailer 10. Illustratively, the floor assembly 26 of the trailer 10 includes right and left base rails 28 coupled extending along the length of the trailer 10. The front end of the trailer 10 is configured to be coupled to an engine or suitable automobile (not shown) for towing the trailer 10 thereon. It should be understood that while the side underride prevention system 12 is shown for use with a trailer 10, the side underride prevention system 12 may be coupled to any vehicle. As shown in FIG. 2, the side underride prevention system 12 is coupled to the floor assembly 26 of the trailer 10 to extend downwardly from a base rail 28 of the trailer by coupling hinge 40 on the front end and by coupling hinge 42 on the rear end. The side underride prevention system 12 is positioned between the rear wheel assembly 22 and the front landing gear 24 in order to prevent under riding from sideways under the floor assembly 26 of the trailer 10 while moving.

Illustratively, the trailer 10 includes two side underride prevention systems 12. In particular, one system 12 is coupled to one side of the floor assembly 26 of the trailer 10 to extend downwardly from the floor assembly 26 generally parallel to the corresponding side wall 14 of the trailer 10 while the other system 12 is coupled to the other side of the floor assembly 26 to extend downwardly from the floor assembly 26 generally parallel to the corresponding side wall 14 of the trailer 10. For purposes of the description herein, however, only one side underride prevention system 12 will be described herein. However, it should be understood that the two side underride prevention systems 12 of the trailer 10 are identical in configuration and function. The two side underride prevention systems 12 are connected to each other on front end and rear end under the floor assembly 26 of the trailer 10.

Figure 16:
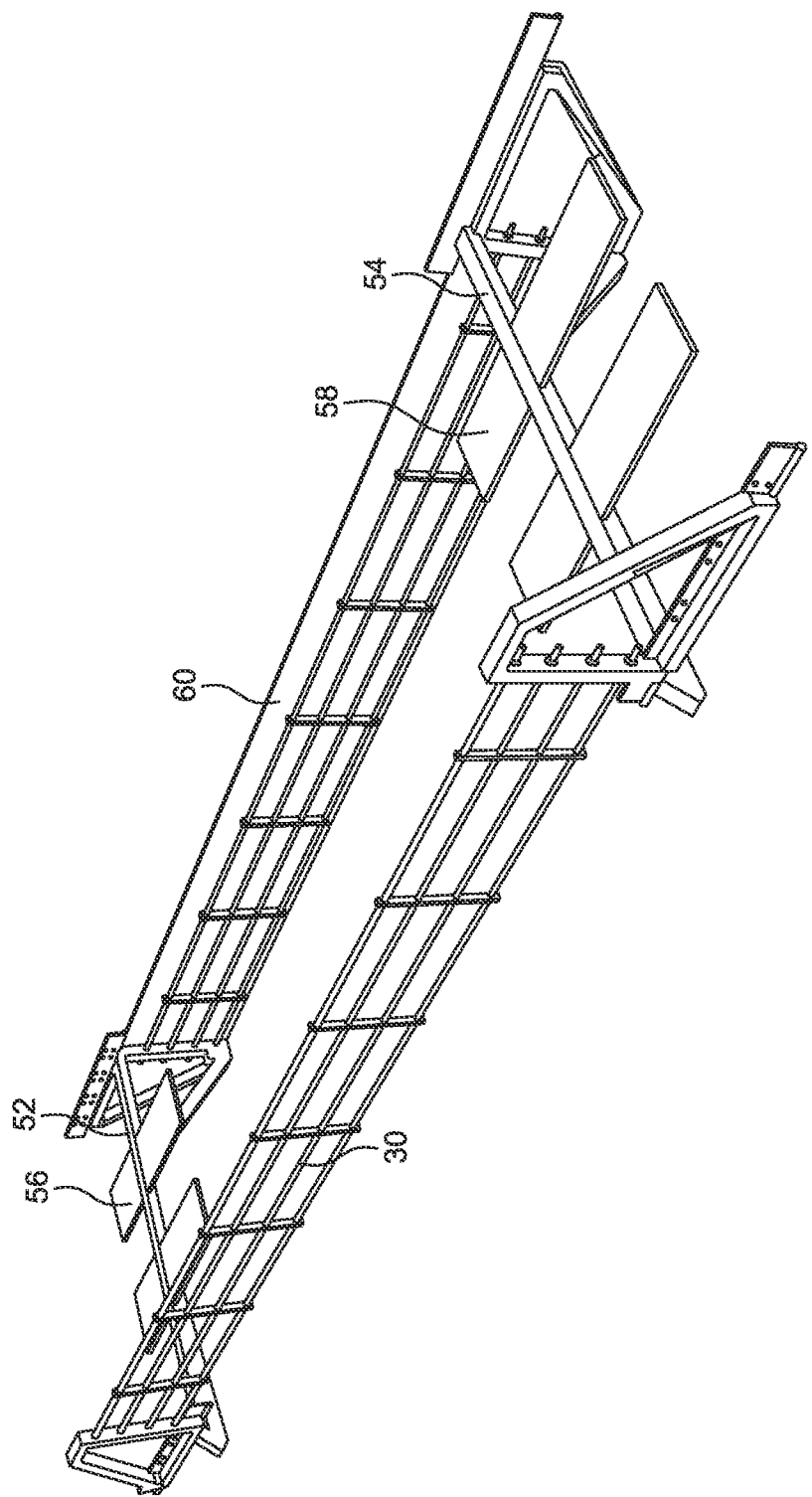
FIG. 16 is a perspective view of the side underride prevention system with one side in upward and stowed configuration and one side in downward configuration with an aerodynamic covering.
Figure 17:
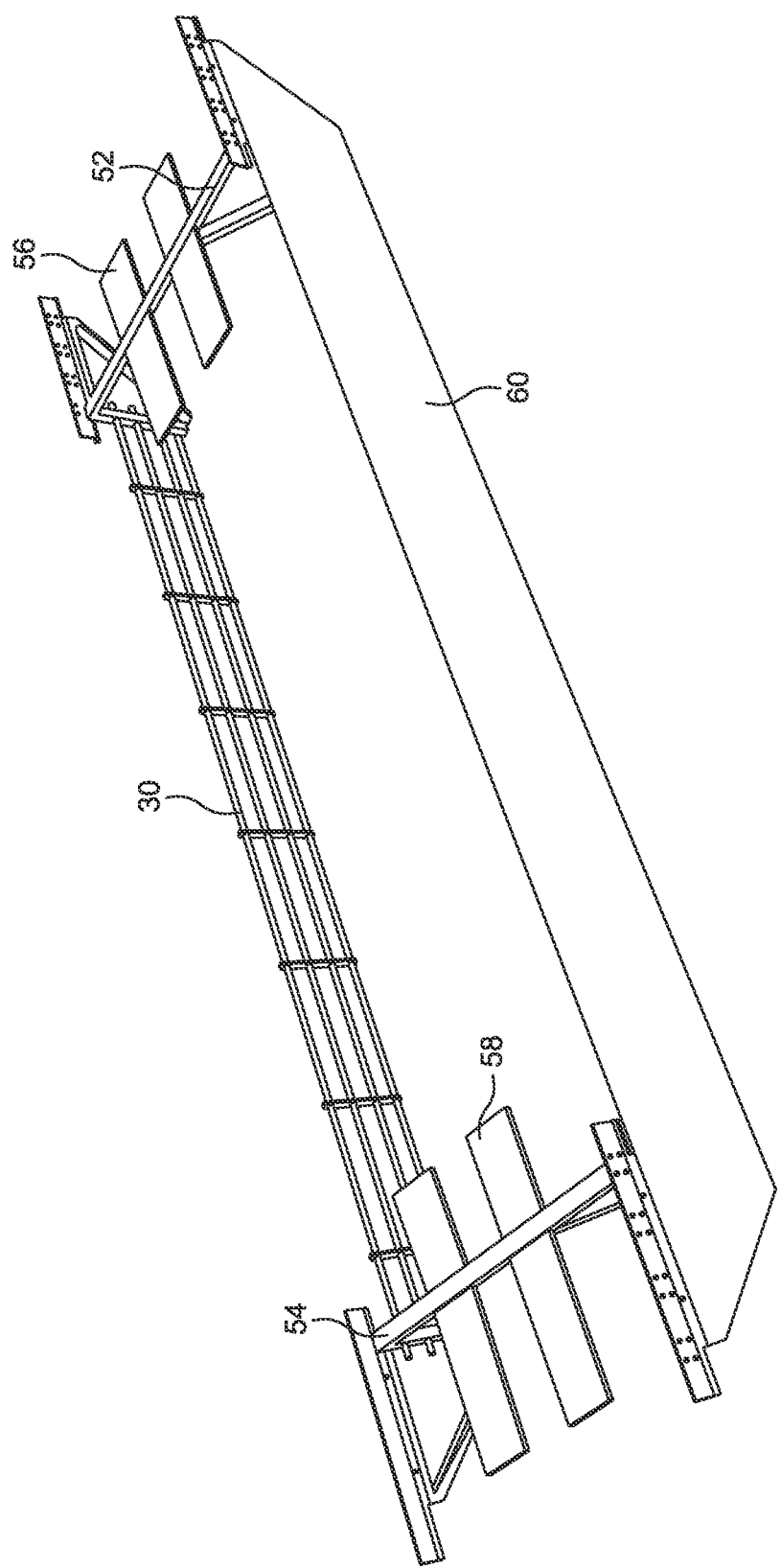
FIG. 17 is a perspective view of the side underride prevention system with both sides in downward and deployed configuration and one side with the aerodynamic covering.

As depicted in FIGS. 1-6, the side underride prevention system 12 includes a cable grid 30, coupled to anchor system 32 on the front end and to anchor system 34 on the rear end. The anchor system 32 and 34 are further secured to the trailer 10 by mounting bracket assembly 36 on the front end and mounting bracket assembly 38 on the rear end respectively using a pair of fastening bolts 44 on each end. As shown in FIGS. 16-17, the mounting bracket assemblies on front end and rear end of each of the two side underride prevention systems 12 of the trailer 10 are connected with a cross supporting member 52 on the front end and a cross supporting member 54 on the rear end under the floor assembly 26 of the trailer 10. The front-end cross supporting member 52 further includes plurality of flanging members 56 extending perpendicularly through the front-end cross supporting member. The rear-end cross supporting member 54 further includes plurality of flanging members 58 extending perpendicularly through the rear-end cross supporting member as shown in FIGS. 10-17. The cross-supporting members and the flanging members of the present invention, secure and support the two side underride prevention systems under the floor assembly 26 of the trailer 10 and also facilitate efficient load bearing and distribution of weight of the trailer 10.

Illustratively, while the side underride prevention system 12 includes two mounting bracket assemblies on each side of the trailer, it is within the scope of this disclosure to provide a side underride prevention system 12 having any number of mounting bracket assemblies, cross supporting members, flanging members, anchor systems, cables and cable grid of any length.

Figure 7:
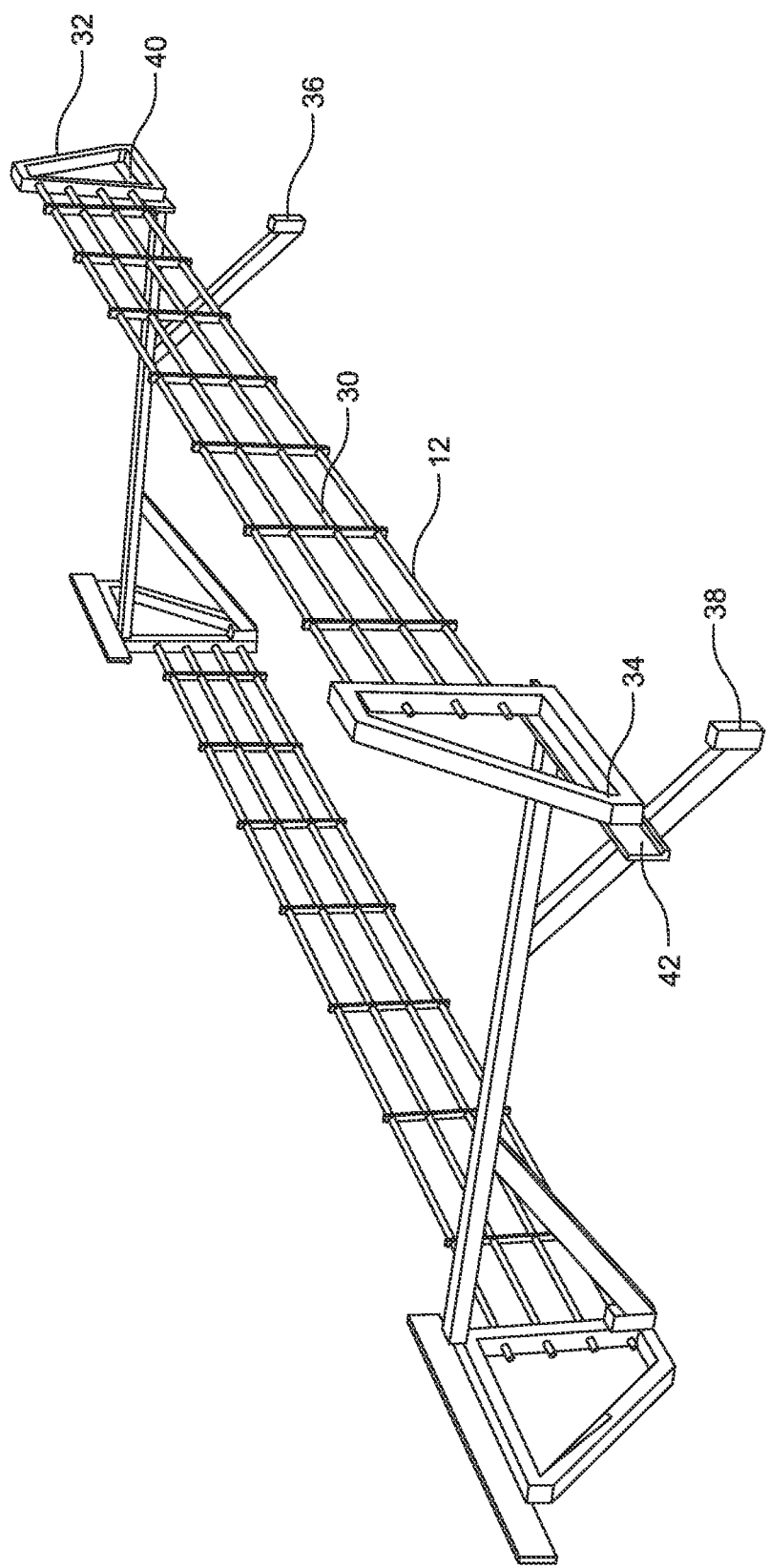
FIG. 7 is a perspective view of the side underride prevention system with the right side in upward and stowed configuration.
Figure 8:
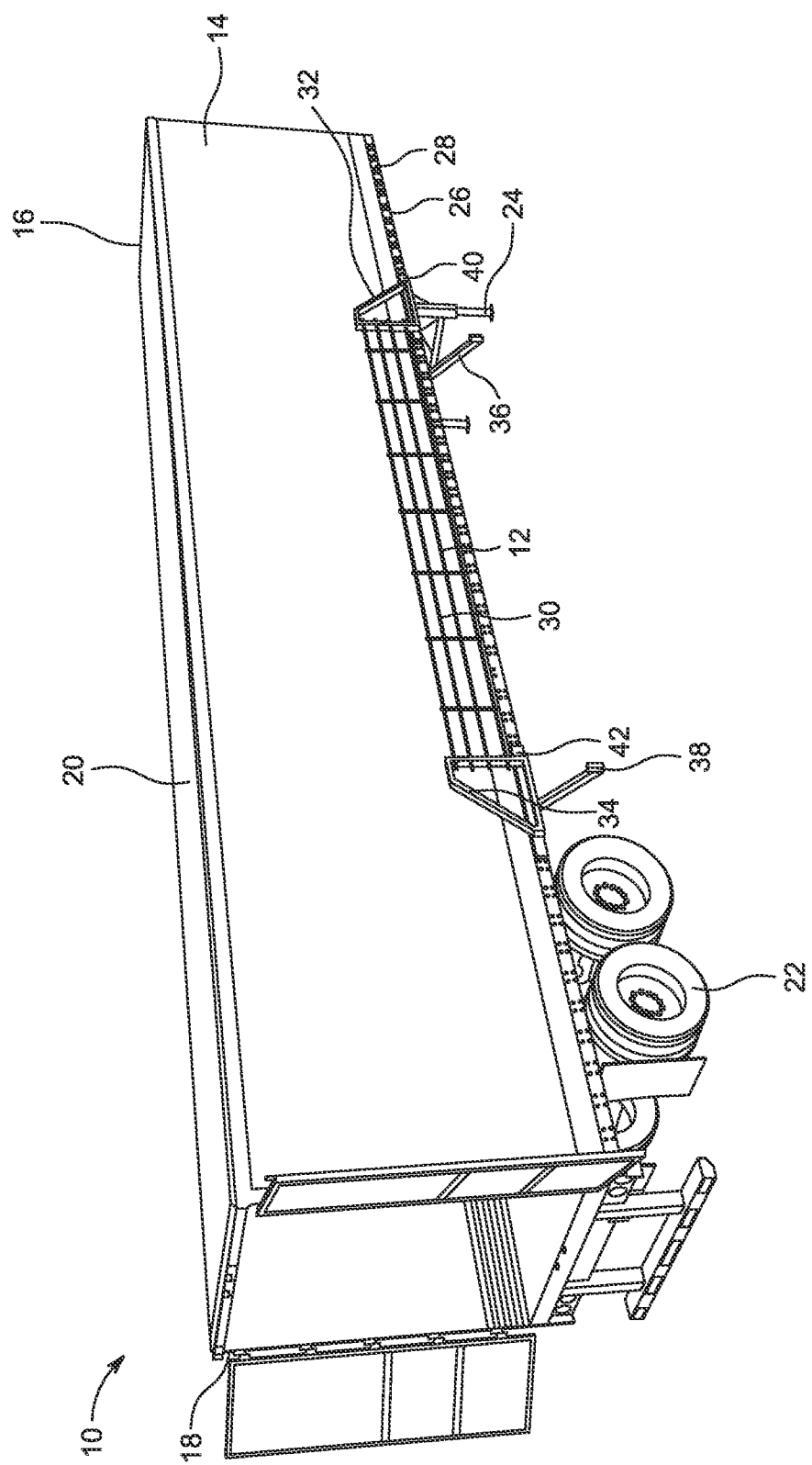
FIG. 8 is a perspective view of the side underride prevention system, including a basic box trailer, in upward configuration.

As shown in FIGS. 3-6, the anchor system 32 is coupled to the base rail 28 of the trailer 10 by the coupling hinge 40 on the front end and the anchor system 34 is coupled to the base rail 28 of the trailer 10 by the coupling hinge 42 on the rear end. Furthermore, the mounting bracket assemblies 36 and 38 allow the side underride prevention system 12 to turn upward and relative to the floor assembly 26 of the trailer 10 by removing the fastening bolts 44 on front and rear end, as shown in FIG. 7 and FIG. 8, to lock the side underride prevention system 12 parallel to the corresponding side wall 14 of the trailer 10 using a latch mechanism. The ability of the side underride prevention system 12 to turn upward and locked, potentially avoids damage when the trailer 10 traverses into or over a fixed, immovable obstacle, and thus runs laterally into the obstacle, for example.

According to one aspect of the present disclosure, a side underride prevention system configured to be coupled to a trailer includes a front anchor system 32 configured to be coupled front bracket assembly 36 and to the trailer 10, a rear anchor system 34 configured to be coupled rear bracket assembly 38 and to the trailer 10 at a location spaced-apart from the front anchor system, and a cable grid 30 comprising plurality of cables configured to extend at least partially along a length of each side of the trailer between the front anchor system and the rear anchor system. The front and rear anchor systems of the present invention can be D-shaped and the front and rear bracket assemblies of the present invention can be V-shaped.

Figure 9:
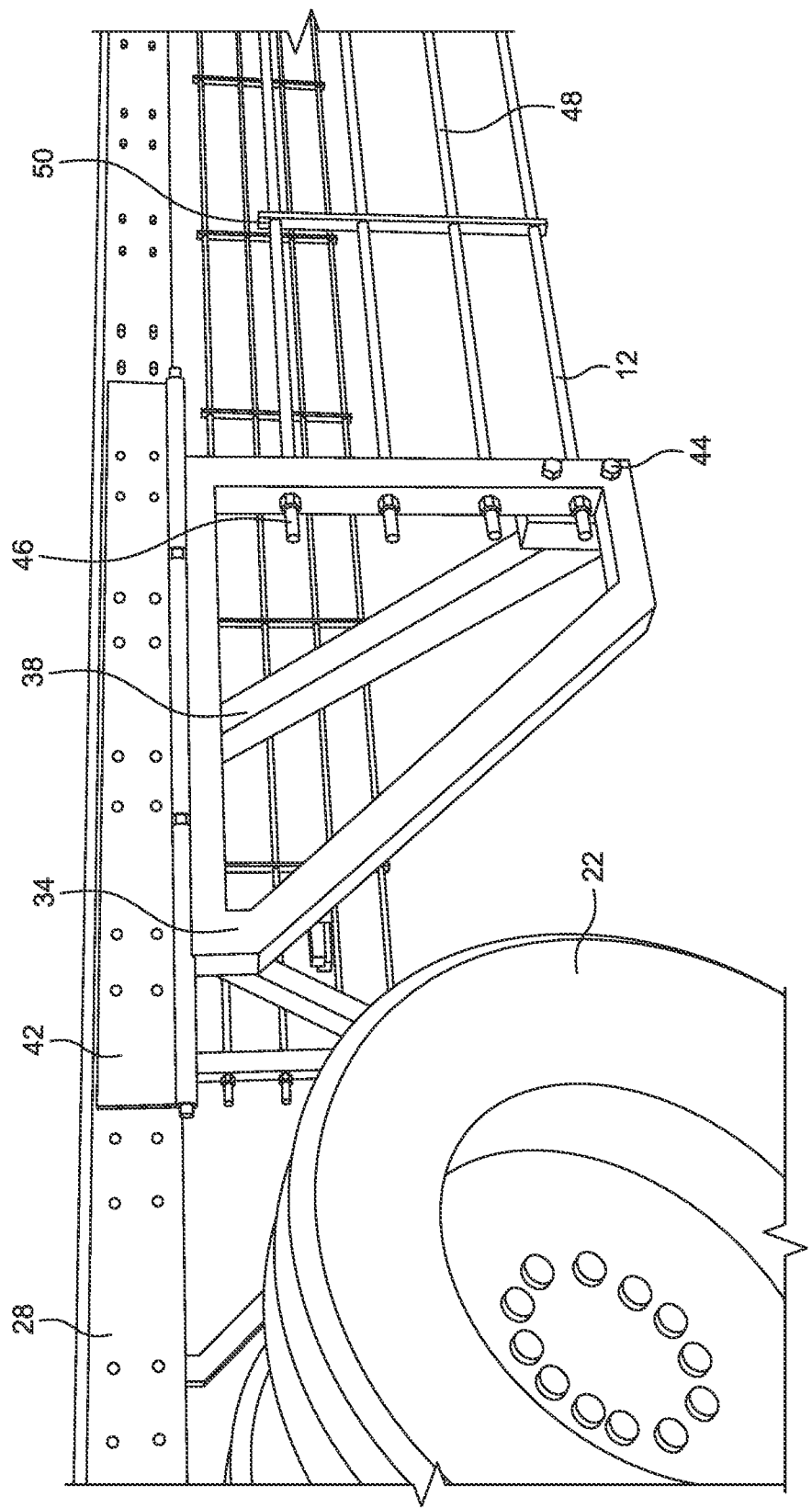
FIG. 9 is a closer perspective view of the rear end of the side underride prevention system.
Figure 10:
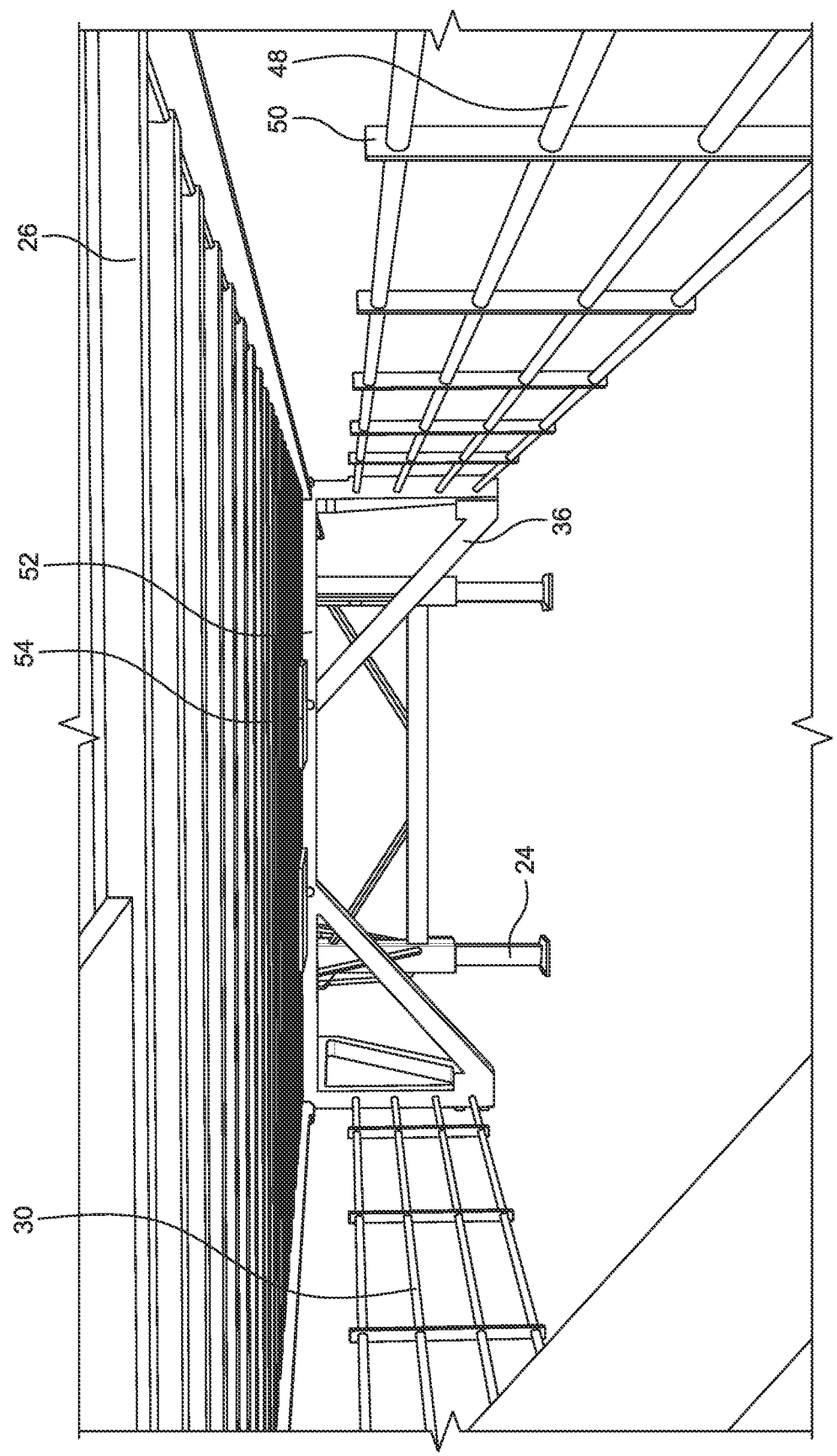
FIG. 10 is an underneath perspective view of the side underride prevention system.
Figure 11:
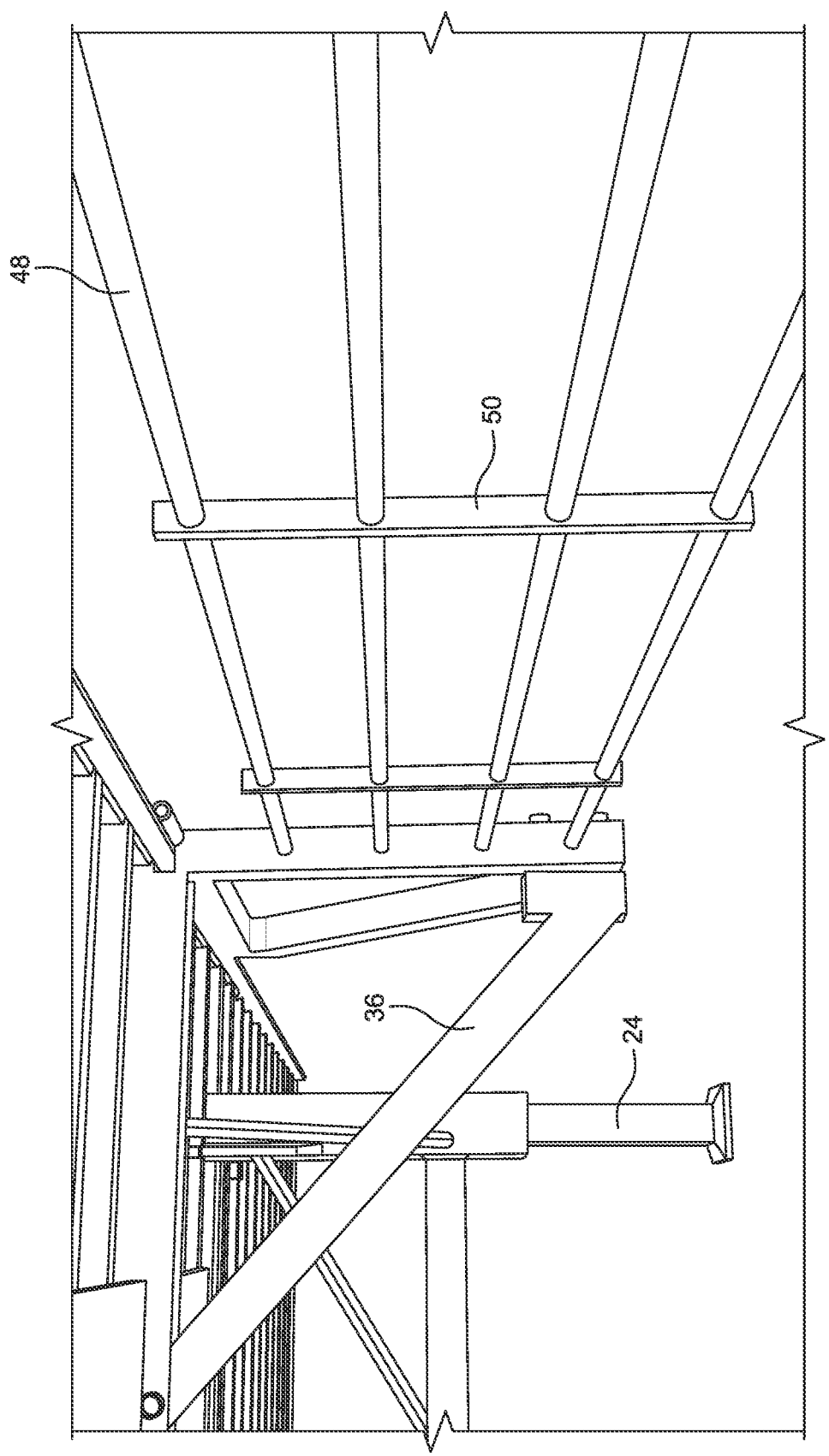
FIG. 11 is a closer perspective view of one end of the side underride prevention system.
Figure 12:
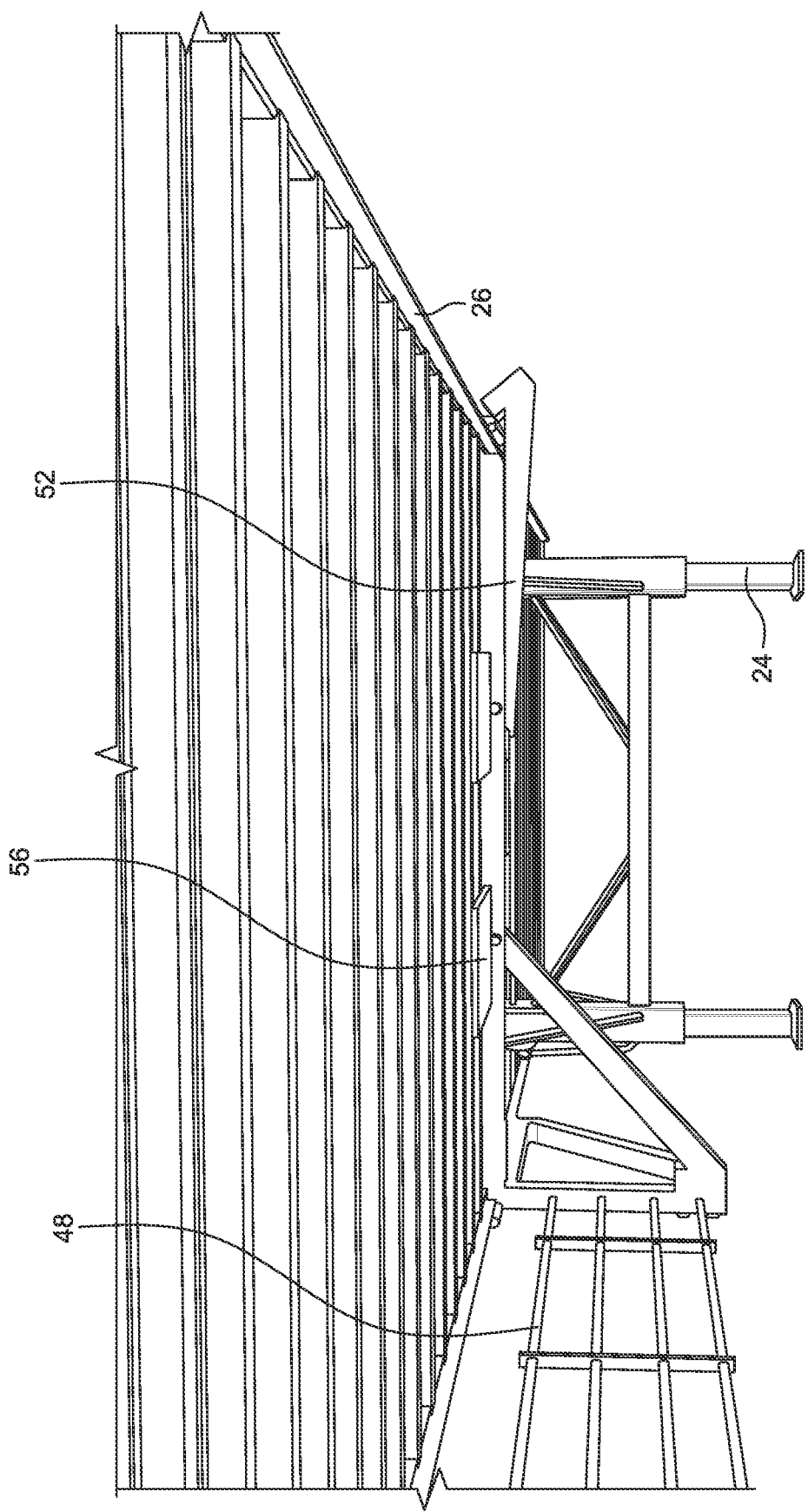
FIG. 12 is an underneath perspective view of one end of the side underride prevention system with one side in upward configuration and one side in downward configuration.
Figure 13:
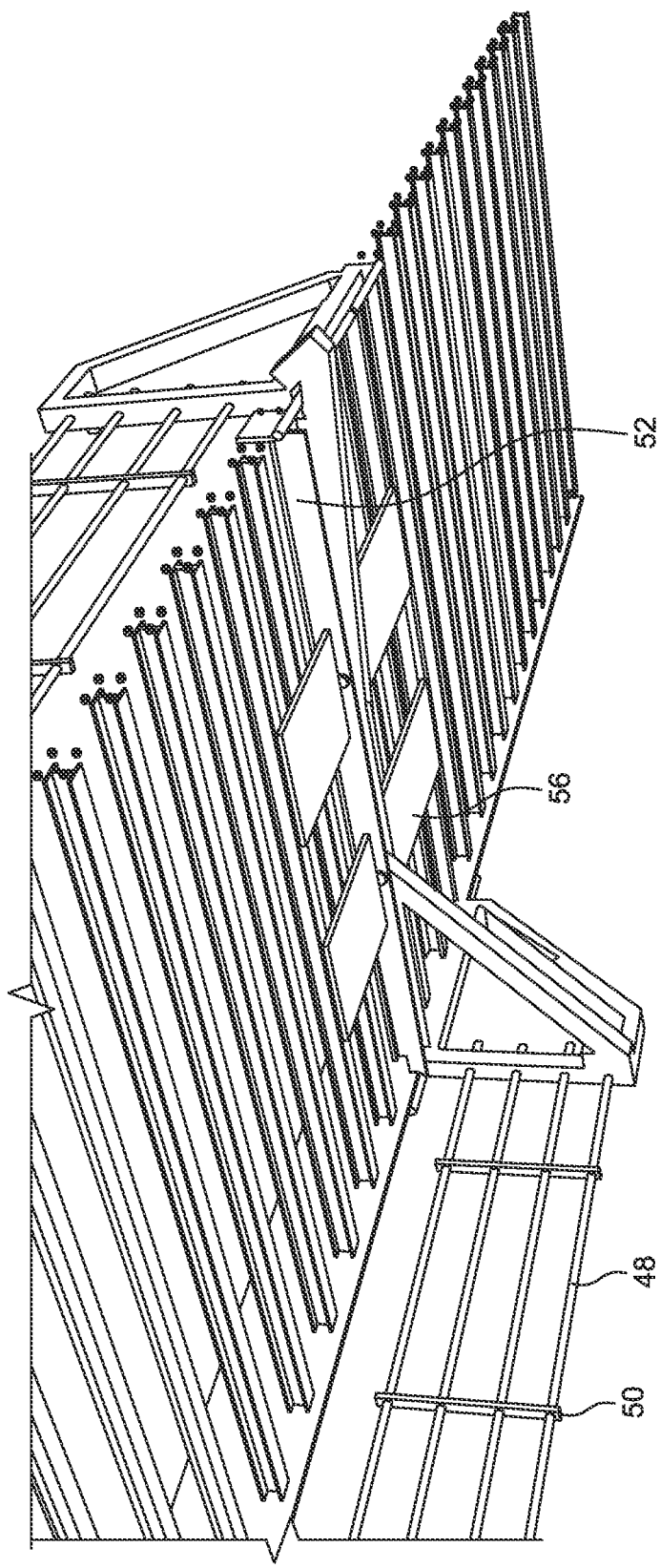
FIG. 13 is a perspective view of one end of the side underride prevention system with one side in upward configuration and one side in downward configuration.
Figure 14:
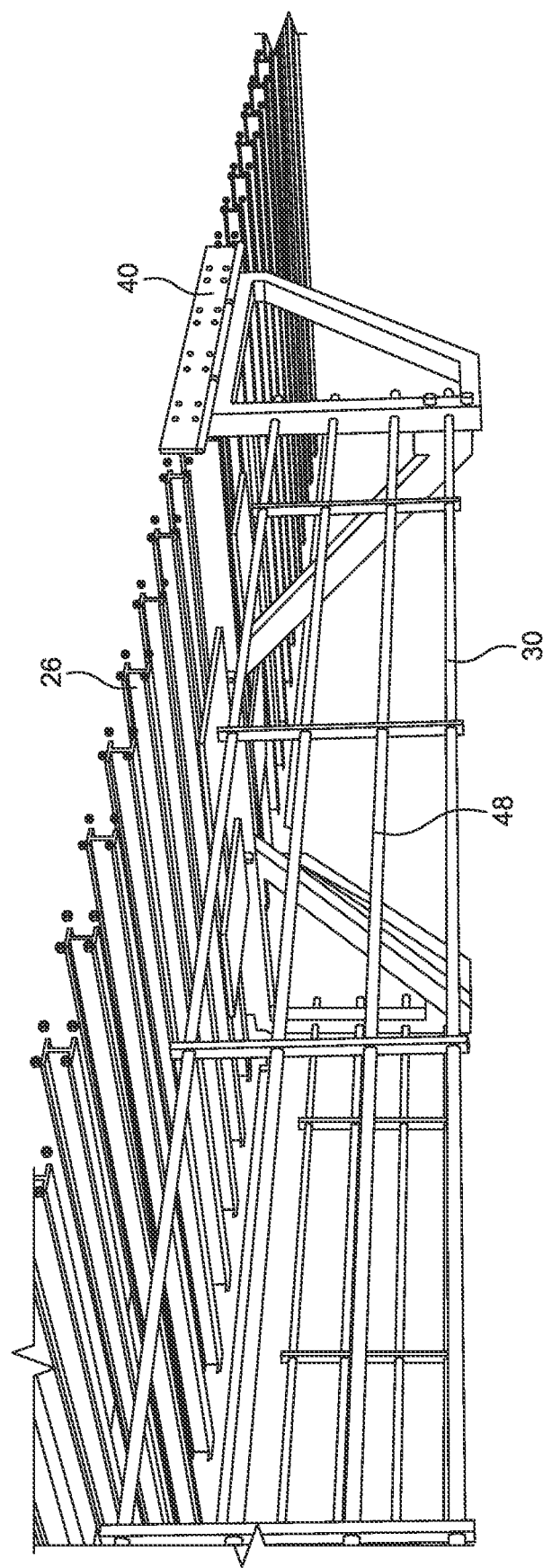
FIG. 14 is a perspective view of one end of the side underride prevention system.
Figure 15:
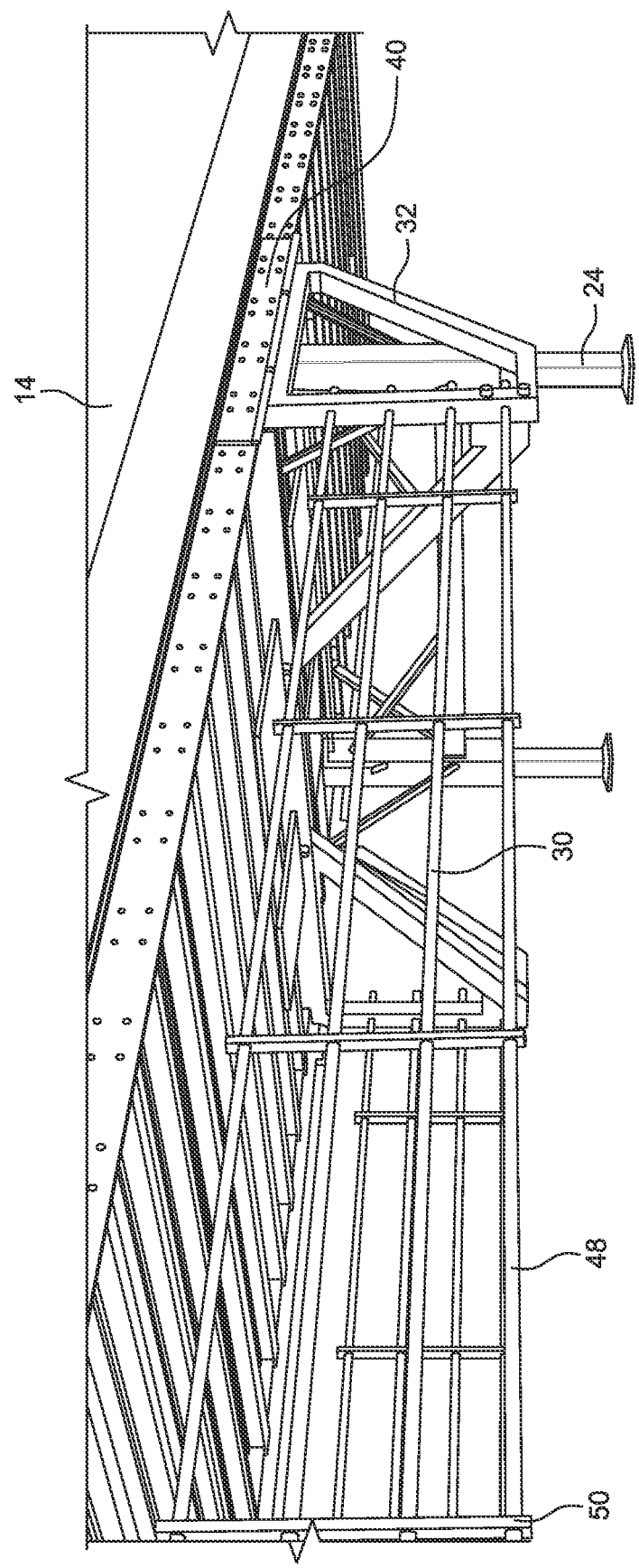
FIG. 15 is a perspective view of one end of the side underride prevention system with the trailer.

According to another aspect of the present disclosure, a side underride cable system configured to be coupled to a trailer includes a cable grid 30 configured to be coupled to the trailer and to be positioned below a first side wall of the trailer to extend at least partially along a length of the first side wall of the trailer. The cable grid 30 can be a plurality of cables 48 supported with plurality of vertical support 50 at regular intervals to retain the cables in place and configured to extend at least partially along a length of each side of the trailer between the front anchor system 32 and the rear anchor system 34 using cable tensioning nuts 46 fastened on each end of each cable. Illustratively, each cable of the plurality of cables may extend through an aperture formed in each of the vertical support 50 and in each of the front and rear anchor system as shown in FIG. 9.

Figure 18:
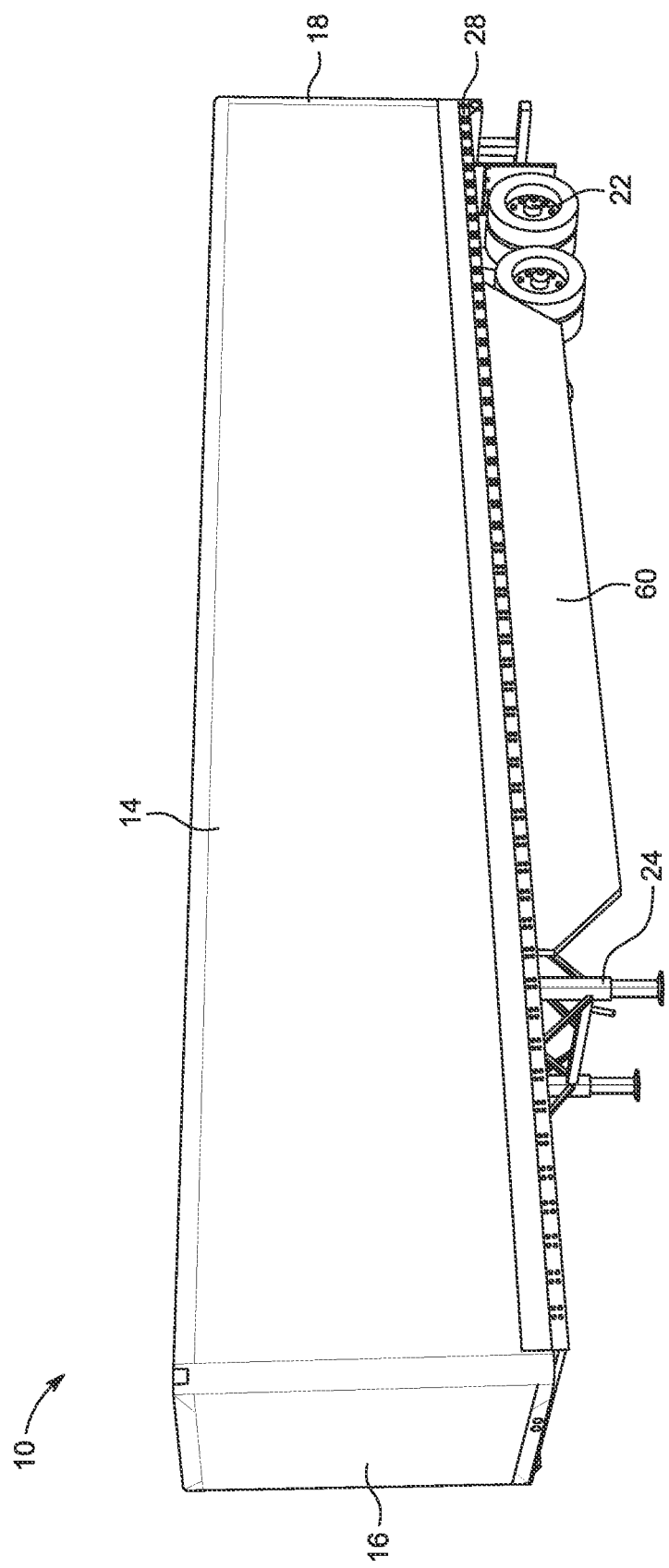
FIG. 18 is a left side perspective view of the trailer with the aerodynamic covering.

Illustratively, each of the cables 48 of the cable grid 30 is parallel to each other cable and to the first side wall 14 of the trailer. Each of the cables 48 of the cable grid 30 can be pretensioned cables and can range from ½" to ⅝" in size. The cable grid of the present invention can be made of one or more type of materials and can be a rectangular grid. The cable grid, anchor systems, bracket assemblies and hinges can be made of metal or composite material. For example, the composite material may include a plastic core and metal outer skins coupled to the plastic core. Such a composite material provides a rigid, but lightweight and durable material. Further, the cable grid, anchor systems and bracket assemblies may be made of any number of suitable, composite materials, metals, metal alloys, and/or plastics. The side underride prevention system 12 of the present invention may further optionally incorporate polyvinyl aerodynamic covering 60 on the cable grid for damage protection and fuel efficiency as shown in FIGS. 16-18.

Figure 3:
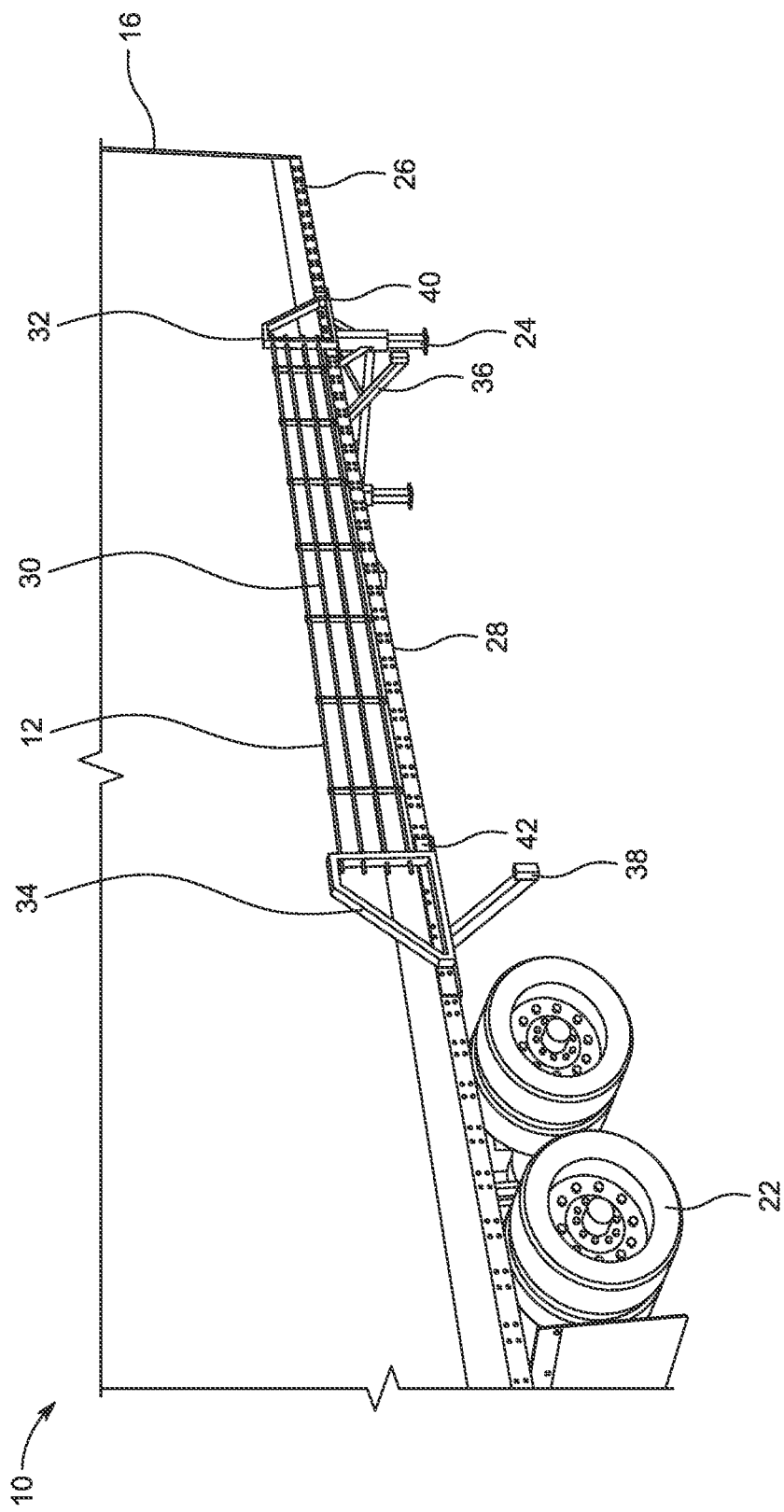
FIG. 3 is a right-side perspective view of the side underride prevention system in upward and stowed configuration.
Figure 4:
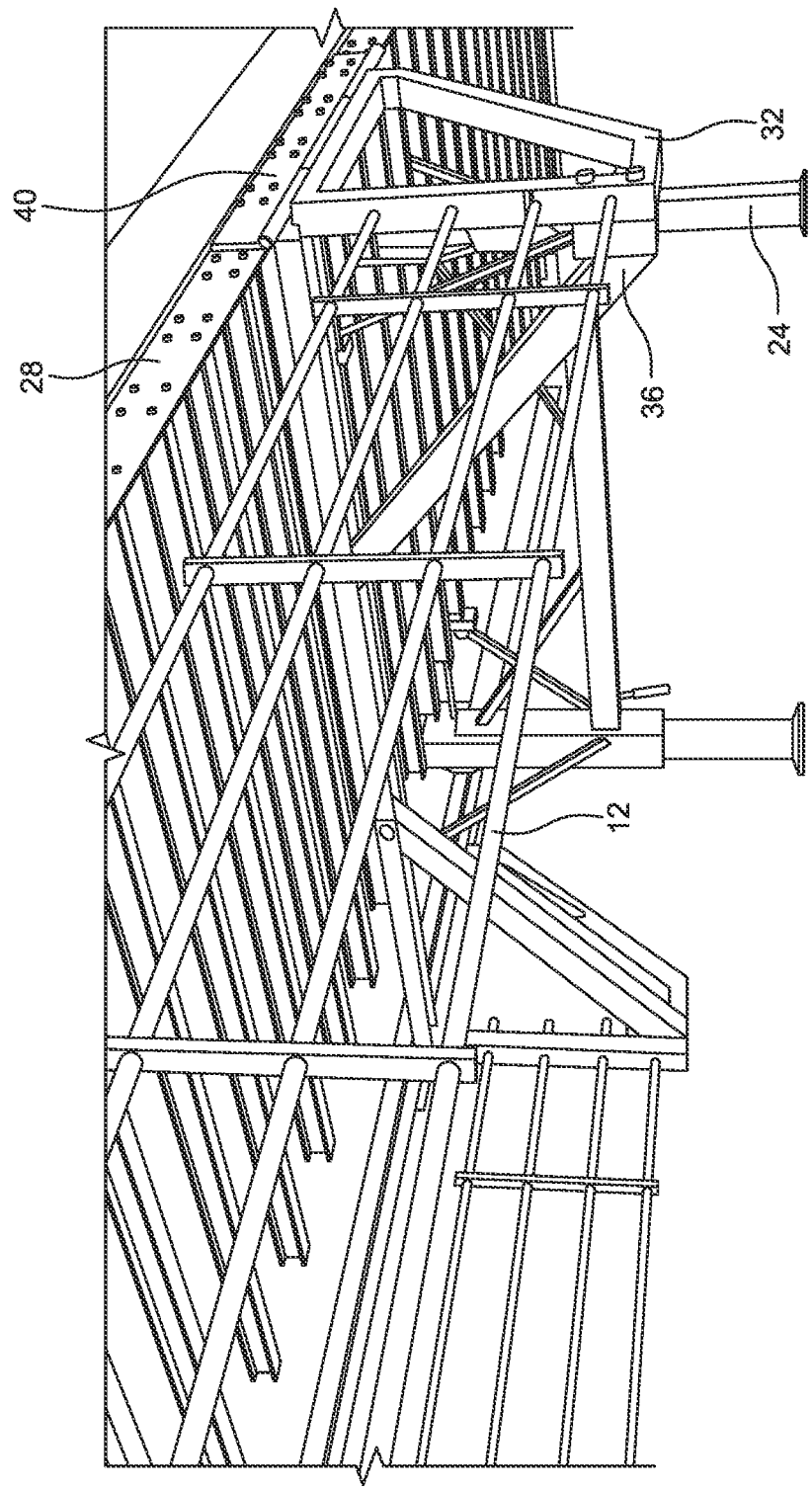
FIG. 4 is a perspective view of the front end of the side underride prevention system.
Figure 5:
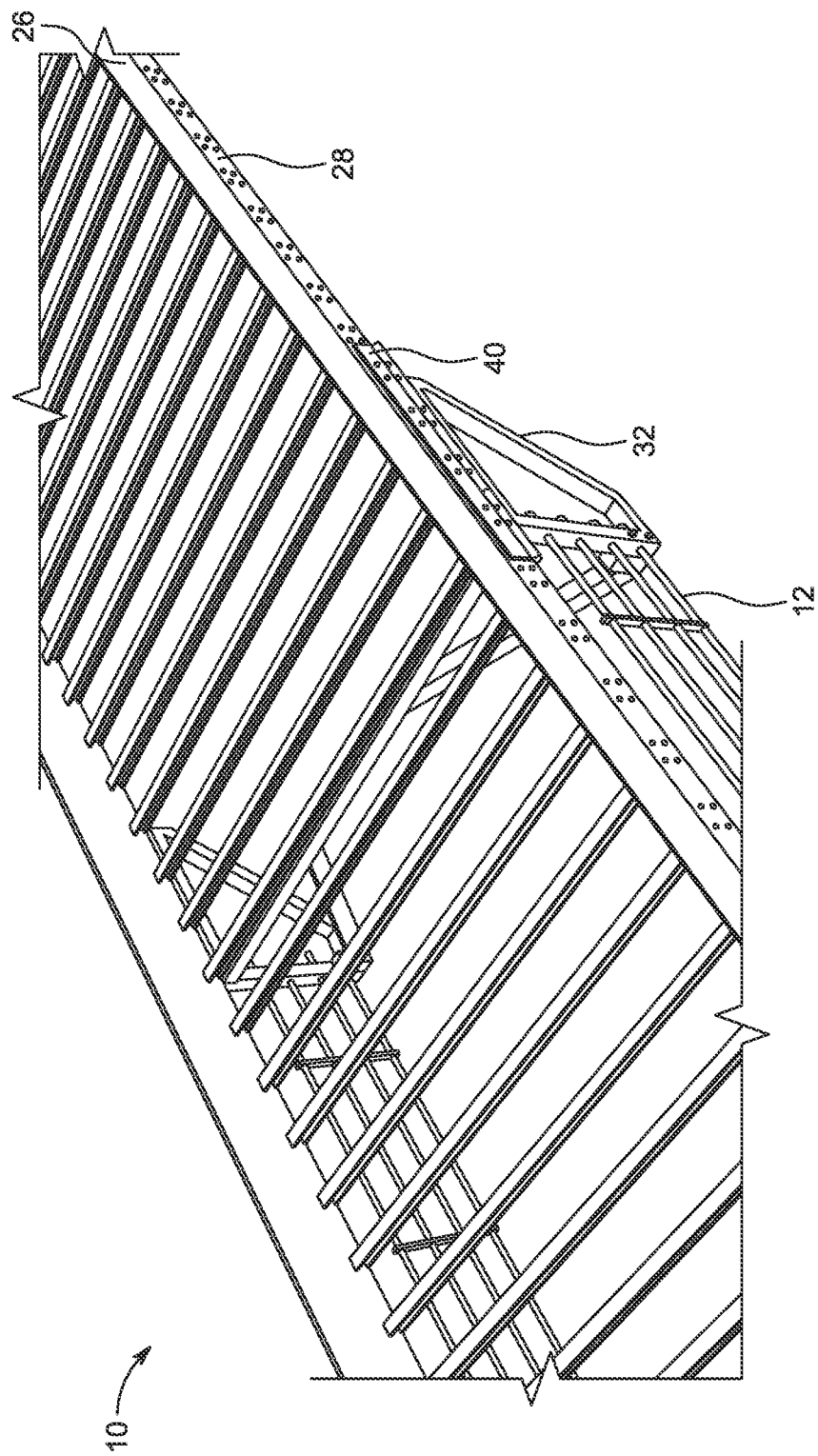
FIG. 5 is a typical trailer floor support structure illustrating the load distribution structures and platens.
Figure 6:
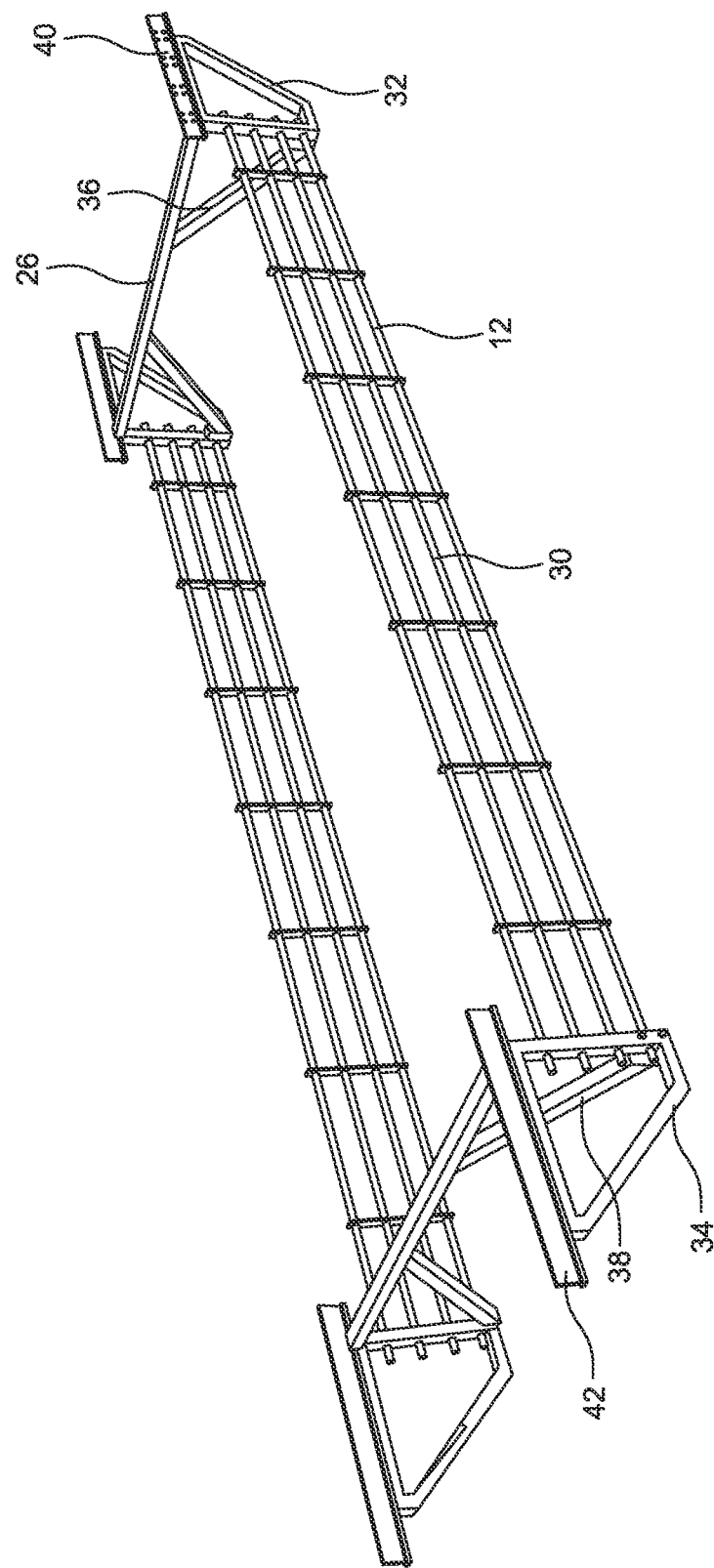
FIG. 6 is a perspective view of the side underride prevention system.

The side underride prevention system 12 of the present invention is configured to be rotatably attached to the trailer 10 which allows it to temporarily turn downward and upward positions up to 180-degree angle on one or both sides of the trailer. As shown in FIGS. 1-2, the downward and deployed position is achieved by coupling the side underride prevention system to the front and rear bracket assemblies using plurality of fastening bolts 44, thus preventing under-riding the trailer from sideways when on road. As shown in FIG. 3, the side underride prevention system can be turned in upward and stowed position and locked with a latch with minimal help, allowing access to the underside of the trailer, and is suitable for off road and construction use.

It should be appreciated that one of the unique features believed characteristic of the present invention is the configuration of each side of the underride system that allows for the system to prevent objects from under riding the trailer, and further allows for easy disengagement from any object that comes into contact therewith. The side underride prevention system is configured and designed to be attached to the underside of the trailer using the existing floor structures and base rails of the trailer, thereby requiring minimal additional structural components for attachment.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A side underride prevention system configured to be coupled to a trailer and to be positioned below a side wall of the trailer, comprising:
    a cable grid;
    a front anchor system;
    a rear anchor system;
    a front bracket assembly; and
    a rear bracket assembly
    wherein the cable grid is configured to be coupled with front anchor system and rear anchor system;
    wherein the front bracket assembly secures the front anchor system to the side wall of the trailer;
    wherein the rear bracket assembly secures the rear anchor system to the side wall of the trailer;
    wherein the side underride prevention system is configured to be removably turned upward and locked parallel to the side wall of the trailer;
    wherein the side underride prevention system is configured to be deployed during the trailer operation on road;
    wherein the side underride prevention system is configured to be turned upward in stowed position when required or when trailer is not in operation on road.

2. The system of claim 1, wherein the cable grid is configured to be rectangular grid.

\* \* \* \* \*